United States Patent [19]
Hayashi et al.

[11] 3,936,421
[45] Feb. 3, 1976

[54] PROCESS OF PREPARING POLYTETRAMETHYLENE TEREPHTHALATE

[75] Inventors: Masahiko Hayashi; Hiroyuki Ikeuchi; Michihiko Tanaka, all of Ehime, Japan

[73] Assignee: Toray Industries, Inc., Tokyo, Japan

[22] Filed: Nov. 13, 1974

[21] Appl. No.: 523,362

[30] Foreign Application Priority Data
Nov. 19, 1973 Japan................. 48-129150

[52] U.S. Cl. ............... 260/45.75 K; 260/45.75 F; 260/45.75 S; 260/45.75 T; 260/45.85 B; 260/45.95 C; 260/45.95 H; 260/45.95 R; 260/75 R; 260/75 T
[51] Int. Cl.². C08G 63/14; C08K 5/05; C08K 5/58; C08K 5/13
[58] Field of Search.......... 260/45.75 F, 75 R, 75 T, 260/45.95, 45.85, 45.75 S, 45.75 T, 45.75 K

[56] References Cited
UNITED STATES PATENTS

| | | | |
|---|---|---|---|
| 2,437,232 | 3/1948 | Rothrock et al.............. | 260/45.7 |
| 2,465,319 | 3/1949 | Whinfield et al. ............. | 260/75 |
| 3,285,855 | 11/1966 | Dexter et al. ................. | 260/45.85 |
| 3,361,846 | 1/1968 | Gleim et al. .................. | 260/45.7 |
| 3,670,489 | 6/1972 | Jackson et al. ................ | 260/75 |
| 3,763,109 | 10/1973 | Witsiepe ....................... | 260/45.75 |
| 3,796,691 | 3/1974 | Chimura et al. .............. | 260/75 |

*Primary Examiner*—V. P. Hoke
*Attorney, Agent, or Firm*—Haseltine, Lake & Waters

[57] ABSTRACT

A process for preparing a polyester predominantly comprised of the units derived from terephthalic acid and butanediol-1,4 is provided. The esterification or transesterification is performed in the presence of minor amounts of a catalyst combination comprising an organo-titanium compound and an organo-tin compound. The undesirable formation of tetrahydrofuran can be avoided or minimized.

8 Claims, No Drawings

PROCESS OF PREPARING POLYTETRAMETHYLENE TEREPHTHALATE

This invention relates to a process of preparing a polytetramethylene terephthalate. More particularly, it relates to a process of preparing a linear polyester predominantly comprised of the units derived from terephthalic acid and butanediol-1,4 wherein the esterification or transesterification is performed in the presence of a novel catalyst combination.

Heretofore, various materials have been proposed as catalysts for the esterification of terephthalic acid with ethylene glycol and the transesterification of a lower dialkyl ester of terephthalic acid with ethylene glycol. However, there has been no material capable of being satisfactorily used for the esterification of terephthalic acid with butanediol-1,4 and the transesterification of a lower dialkyl ester of terephthalic acid with butanediol-1,4.

When the esterification of transesterification of terephthalic acid or its lower dialkyl ester with butanediol-1,4 is carried out by employing a material and reaction conditions, which are known in the art as a preferable catalyst and preferable reaction conditions for the esterification or transesterification of terephthalic acid or its lower dialkyl ester with ethylene glycol, the reaction rate is very low or the reaction is not completed in most cases even after a long reaction period. It is believed that this disadvantage is due to the fact that unreacted butanediol-1,4 or butanediol-1,4 from the tetramethylene glycol-ester end group of the esterification or transesterification product is cyclized into tetrahydrofuran because of heat. Such undesirable formation of tetrahydrofuran inevitably leads to prolongation of the esterification or transesterification reaction time required, and reduction in the quality and yield of polymer.

It is a main object of the present invention to provide a process of preparing a linear polyester predominantly comprised of the units derived from terephthalic acid and butanediol-1,4 wherein the esterification or transesterification is performed with little or no formation of tetrahydrofuran.

This and other objects and advantages of the present invention will be apparent from the following description including the working examples.

In accordance with the present invention, there is provided a process of preparing a linear polyester predominantly comprised of the units derived from terephthalic acid and butanediol-1,4 characterized in that the esterification of terephthalic acid with butanediol-1,4 or the transesterification of a lower dialkyl ester of terephthalic acid with butanediol-1,4 is carried out in the presence of, as catalysts, 0.001 to 0.5 percent by weight of at least one organo-tin compound and 0.001 to 0.5 percent by weight of at least one organo-titanium compound, both based on the weight of the resulting polyester.

By the term "linear polyester predominantly comprised of the units derived from terephthalic acid and butanediol-1,4", used herein, is meant polytetramethylene terephthalate and a copolyester prepared from at least 60 percent by mole of terephthalic acid or its lower dialkyl ester such as dimethyl terephthalate and at least 60 percent by mole of butanediol-1,4 and at most 40 percent by mole of any other copolycondensable polycarboxylic acids or their lower polyalkyl esters and at most 40 percent by mole of any other copolycondensable polyols. Illustrative of such copolycondensable compounds are isophthalic acid, adipic acid, sebacic acid, azelaic acid, dodecane dicarboxylic acid, hexahydroterephthalic acid, phenylindanedicarboxylic acid, trimellitic acid, trimesic acid and 2,6-naphthalenedicarboxylic acid and their lower alkyl esters, and ethylene glycol, neopentyl glycol pentaerythritol and hexanediol-1,6.

The organo-titanium compounds used in the invention are those expressed by the formula

$$(OR)_4 \quad (1)$$

where R is selected from an alkyl group having 1 to 30 carbon atoms and an aryl group having 6 to 12 carbon atoms and may be the same as or different from each other, or their hydrolyzed products of their transesterified products. Illustrative of the organo-titanium compounds are tetramethyl titanate, ethylene glycol titanate, tetrabuthylene glycol titanate, tetrabuthyl titanate, tetraisopropyl titanate, tetra(2-ethylhexyl) titanate, tetraoctyl titanate and tetrastearyl titanate, and their partially or completely hydrolyzed products and their transesterified products, and their hydrolyzed and transesterified products. These organo-titanium compounds may be used alone or in combination.

The organo-tin compounds used in the invention are those expressed by the formulae

(2)

or

(3)

where R is selected from an alkyl group having 1 to 30 carbon atoms and an aryl group having 6 to 12 carbon atoms; $X_1$, $X_2$, $X_3$ and $X_4$ are selected from an alkyl group having 1 to 30 carbon atoms, an aryl group having 6 to 12 carbon atoms, an acyloxy group having 1 to 10 carbon atoms, cyclohexyl group, hydroxyl group, a carboxylic acid residue and halogen, and each of $X_1$, $X_2$ and $X_3$ may be the same as or different from others; and $X_5$ is either sulfur or oxygen. Illustrative of the organo-tin compounds are tetraethyltin, triethyltin hydroxide, triphenyltin hydroxide, triisobutyltin acetate, dibuthyltin diacetate, diphenyltin dilaurate, monobutyltin trichloride, dibutyltin dichloride, tributyltin chloride, methylphenyltin oxide, dibuthyltin oxide, didodecyltin oxide, dibutyltin sulfide and butylhydroxytin oxide. These organo-tin compounds also may be used alone or in combination.

The amounts of the organo-titanium compound and the organo-tin compound employed vary depending upon the particular compounds and the esterification or transesterification conditions. In general each of the organo-titanium compound and the organo-tin compound may be present in the reaction mixture in an amount of 0.001 to 0.5 percent by weight, preferably 0.01 to 0.1 percent by weight, based on the weight of the resulting polyester. With an amount smaller than the lower limit, the intended effect cannot be obtained. In contrast, with the amount exceeding the upper limit, the resulting polyester is liable to possess an undesirable color. The ratio of the organo-titanium compound to the organo-tin compound is usually from 10:1 to 1:10 by weight.

In the esterification or transesterification of the invention, the molar ratio of butanediol-1,4 to terephthalic acid or its lower dialkyl ester is usually within the range from 1.2 to 2.0. This molar ratio range is lower than those employed in prior art processes for esterifying terephthalic acid with butanediol-1,4, which are usually higher than 3.4. Such a low molar ratio is advantageous from the standpoint that it reduces the amount of tetrahydrofuran produced during the esterification of transesterification.

The procedure whereby the esterification or transesterification of the invention is performed is not critical, and most known procedures may be employed. Usually, the esterification or transesterification is carried out at temperatures of 150° to 230°C and an atmospheric or subatmospheric pressure while water or methanol, and a minor amount of tetrahydrofuran produced are distilled off from the reaction mixture.

It now has been found that, in the process of esterifying terephthalic acid with butanediol-1,4, it is preferable to incorporate a minor amount of water into the reaction mixture at the time the reaction mixture is charged into a reactor or, at the latest, at the initial stage of esterification. The water incorporated increases the fluidity of the reaction mixture and facilitates the mixing or dispersing of terephthalic acid with or into butanediol-1,4 and enhances the reaction rate, at the initial stage of esterification. Consequently, the ratio of butanediol-1,4 to terephthalic acid employed, the amount of tetrahydrofuran produced and the color formation in the resulting polymer can be reduced.

The amount of water incorporated into the reaction mixture may be varied within the range from 1 to 15% by weight, preferably 2 to 8 percent by weight, based on the weight of butanediol-1,4 present in the reaction mixture. Instead of the incorporation of water into the reaction mixture, butanediol-1,4 containing a minor amount of water may be used.

The procedure whereby the esterification or transesterification product is polycondensed into a substantially linear polyester of a desired molecular weight is not narrowly critical and most known procedures may be employed. Usually, the polycondensation is carried out at temperatures of 235° to 270°C and a subatmospheric pressure in the presence of a catalyst.

In order to prevent the undesirable color formation in the resulting polymer, it is preferable to effect the polycondensation in the presence of minor amounts of a phosphorus compound and a hindered phenol compound.

Phosphorus compounds employed include, for example, phosphoric acid, phosphorous acid, hypophosphrous acid, pyrophosphoric acid, phosphoric acid triamide, ammonium phosphate, monomethyl phosphate, dimethyl phosphate, monoethyl phosphate, diethyl phosphate, trimethyl phosphate, dimethyl phosphite, trimethyl phosphite, phenylphosphonic acid, dimethyl phenylphosphonate, dimethyl benzylphosphonate, dimethyl ethylphosphonate, diphenylphosphinic acid, tetrakishydroxymethyl-phosphonium chloride and triphenyl phosphine oxide. These may be used alone or in combination.

Hindered phenol compounds employed mean sterichindered phenol compounds and include, for example, compounds represented by the following formulae

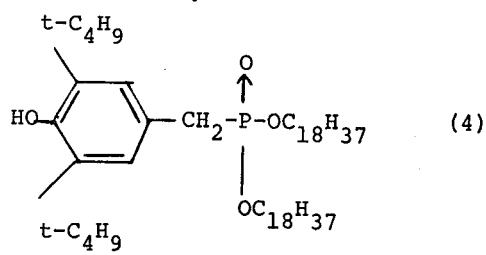

where R₂ is selected from octyl, lauryl and stearyl groups,

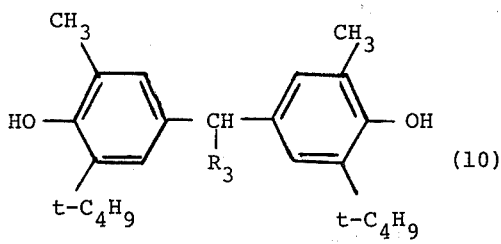

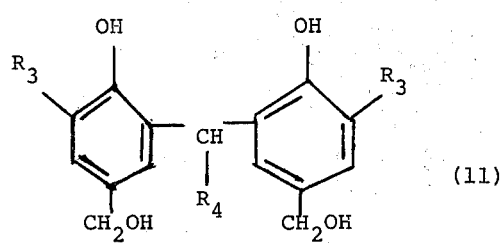

where $R_3$ and $R_4$ are selected from methyl, ethyl, n-propyl, isopropyl, n-butyl, isobutyl, t-butyl, amyl, octyl, nonyl and lauryl groups. These also may be used alone or in combination.

In general each of the phosphorus compound and the hindered phenol compound may be used in an amount of 0.001 to 0.5 percent by weight, preferably 0.01 to 0.1 percent by weight, based on the weight of the resulting polyester. These compounds may be added to the reaction mixture in the stage after the completion of esterification or transesterification but before the completion of polycondensation. The most preferable time is immediately before the commencement of polycondensation.

If desired, additives such as delusterant and modifier may be incorporated in to the polycondensation mixture.

The main feature of the invention resides in the usage of an organo-titanium compound and an organo-tin compound in the esterification or transesterification stage. Thus, undesirable formation of tetrahydrofuran can be avoided or minimized. Consequently, the time required for the esterification or transesterification is shortened, the loss of butanediol-1,4 employed is minimized, and the resulting polyester is of high quality and used advantageously for fibers, films and molded articles.

The invention will be further specifically described by the following illustrative, but not limitative, examples in which all percentages and parts are by weight unless otherwise specified. The intrinsic viscosity of polymer was determined in orthochlorophenol at 25°C.

EXAMPLE 1

75.5 g of terephthalic acid, 69.7 g of butanediol-1,4 (the molar ratio of terephthalic acid to the butanediol was thus 1/1.7), 0.075 g of tetra-n-butyl titanate and 0.03 g of butylhydroxytin oxide were charged into a reactor equipped with a rectification column. The reaction mixture was agitated and maintained at temperatures of 220° to 225°C while the water and tetrahydrofuran produced were distilled off. This esterification reaction was continued until the major part of the water produced was removed and the reaction was substantially completed, i.e. the reaction mixture became substantially transparent. The reaction time required was 60 minutes. The distilled water (18 g) contained 4.0 g of tetrahydrofuran.

The product so prepared was mixed with 0.02 g of tetra-n-butyl titanate in an autoclave. The mixture was maintained at 250°C under a reduced pressure of below 1 mmHg over a period of 2 hours to complete polycondensation. The polymer so prepared had an intrinsic viscosity of 0.84 dl/g.

For comparison purposes, the above procedure for esterification was repeated twice without utilizing either tetra-n-butyl titanate or butylhydroxytin oxide was not used. All other conditions remained substantially the same. In the case where tetra-n-butyl titanate was not used, the time required for the completion of esterification was 80 minutes and the distilled water (28.1 g) contained 9.4 g of tetrahydrofuran. In the case where butylhydroxytin oxide was not used, the time required for the completion of esterification was 70 minutes and the distilled water (23.0 g) contained 8.5 g of tetrahydrofuran.

EXAMPLE 2

5,000 g of terephthalic acid, 4,600 g of butanediol-1,4 (the molar ratio of teraphthalic acid to the butanediol was thus 1/1.7), 4.97 g of tetra-n-butyl titanate and 2.65 g of butylhydroxytin oxide was charged into a reactor. The mixture was treated in a manner similar to that described in Example 1 to effect esterification. The time required for the completion of esterification was 3 hours and 35 minutes. The distilled water (1,700 g) contained 440 g of tetrahydrofuran.

For comparison purposes, the above procedure was repeated twice, wherein once bytylhydroxytin oxide was not used and in the other case bytylhydroxytin oxide and tetra-n-butyl titanate were not utilized. All other conditions remained substantially the same. In the former case, the time required for the completion of esterification was 3 hours and 49 minutes and the distilled water (1,960 g) contained 670 g of tetrahydrofuran. In the latter case, the esterification reaction was not completed even after 7 hours and 10 minutes had elapsed and the conversion at that time was 78.5 percent. The distilled water (2,560 g) contained 1,511 g of tetrahydrofuran. The reaction product so prepared, in which unreacted terephthalic acid was suspended, was cloudy and not practicable for polycondensation.

EXAMPLE 3

100 kg of terephthalic acid, 86.8 kg of butanediol-1,4 (the molar ratio of terephthalic acid to the butanediol was thus 1/1.6), 66.5 g tetra-n-butyl titanate and 66.5 g of butylhydroxytin oxide was charged into a reactor. The mixture was treated in a manner similar to that in Example 1 to effect esterification. The time required for the esterification conversion of 85 percent was 3 hours and 25 minutes. The distilled water (34 l) contained 9.4 kg of tetrahydrofuran.

The product so prepared was mixed with 66.5 g of tetra-n-butyl titanate and 40 g of phosphoric acid in an autoclave. The mixture was maintained at 250°C under a reduced pressure of below 1 mmHg over a period of 2 hours and 54 minutes to complete polycondensation. The polymer so prepared had an intrinsic viscosity of 0.95 dl/g.

EXAMPLE 4

75 kg of terephthalic acid, 70 kg of butanediol-1,4, 50 g of tetra-n-butyl titanate and 30 g of butylhydroxytin oxide were charged into a reactor. The reaction mixture was agitated and maintained at temperatures of 150°C to 220°C over a period of 3.2 hours while water and tetrahydrofuran produced were distilled off to complete esterification.

The product so prepared was mixed with 30 g of phosphoric acid and 15 g of tetrakis [methylene-3(3,5-di-tert,butyl-4-hydroxyphenyl)propionic acid]methane in an autoclave. The mixture was maintained at 245°C under a reduced pressure of 0.8 mmHg over a period of 3.5 hours to complete polycondensation. The polymer so prepared had a softening period of 229°C, a carboxyl end group content of 29.4 equivalents/10⁶ and an intrinsic viscosity of 0.882 dl/g and was colorless.

The above polymer was maintained at 200°C under a reduced pressure of 0.7 mmHg over a period of 8 hours in a rotary drier to effect solid phase polycondensation. The polymer so prepared had a carboxyl and group content of 14.1 equivalents/$10^6$ and an intrinsic viscosity of 1.75 dl/g, and was colorless.

EXAMPLE 5

The esterification and polycondensation procedures described in Example 4 were repeated wherein some esterifying and polycondensing conditions were varied as shown in Table I below, with all other conditions remaining substantially the same. Results are shown in Table I.

*3 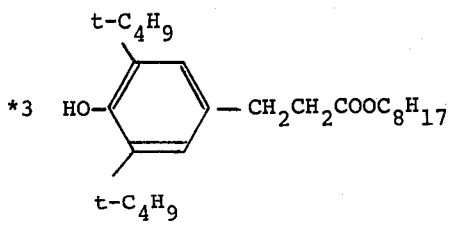

EXAMPLE 6

The esterification and polycondensation procedures described in Example 4 were repeated wherein butanediol-1,4 containing 3 percent of water was used as a starting material instead of butanediol-1,4 containing no water, with all other conditions remaining substantially the same. The time required for the completion of esterification was 2.6 hours. The polymer so prepared had a carboxyl end group content of 28.5 equivalents/$10^6$ g and an intrinsic viscosity of 0.888 dl/g and was colorless.

EXAMPLE 7

48.75 kg of terephthalic acid, 26.25 kg of isophthalic acid, 70 kg of butanediol-1,4, 30 g of ethylene glycol titanate and 15 g of monobutyltin trichloride were charged into a reactor. The reaction mixture was treated in a manner similar to that described in Example 4 to complete esterification wherein the reaction period was 3.6 hours instead of 3.2 hours.

Table I

| Run No. | Esterification catalyst (g) | | Esterification period (hr) | Polycondensation catalyst (g) | Phosphorus compound (g) | Hindered phenol | Polycondensation period (hr) | —COOH content (eq/$10^6$g) | Intrinsic viscosity dl/g | Polymer appearance |
| --- | --- | --- | --- | --- | --- | --- | --- | --- | --- | --- |
| 1 | TBT | 15 | 3.5 | 30 | Trimethyl phosphate 30 | *1 | 4.0 | 30.5 | 0.902 | colorless |
|  | BHTO | 30 |  |  |  |  |  |  |  |  |
| 2 | TBT | 30 | 3.0 | ditto | Phosphoric acid 20 | *2 | 4.0 | 31.0 | 0.895 | colorless |
|  | BHTO | 50 |  |  |  |  |  |  |  |  |
| 3 | TBT | 30 | 3.0 | ditto | ditto | *3 | 4.0 | 32.0 | 0.905 | very slightly yellow |
|  | BHTO | 50 |  |  |  |  |  |  |  |  |

Note: Hindered phenol compounds

*1 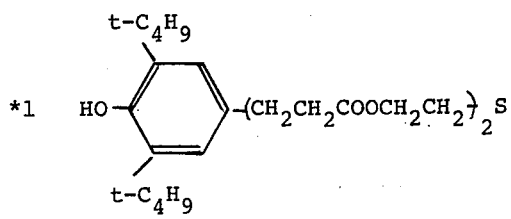

*2 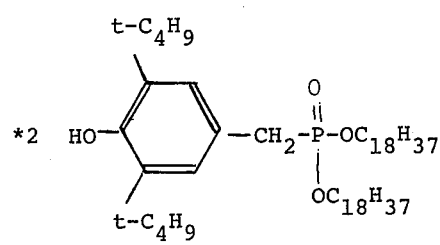

The product so prepared was mixed with 40 g of trimethyl phosphate and 40 g of tetrakis[methylene-3-(3,5-di-tert.butyl-4-hydroxyphenyl)propionic acid]methane in an autoclave. The mixture was maintained at 245°C under a reduced pressure of 0.4 mmHg over a period of 3.2 hours to complete polycondensation. The polymer so prepared had a softening point of 160°C, a carboxyl end group content of 32.5 equivalents/$10^6$ g and an intrinsic viscosity of 1.032 dl/g and was colorless.

EXAMPLE 8

88.0 kg of dimethyl terephthalate, 45.0 kg of butanediol-1,4, 30 g of ethylene glycol titanate and 30 g of dibutyltin oxide were charged into a reactor. The reaction mixture was agitated and maintained at temperatures of 140° to 194°C over a period of 2.9 hours while methanol produced was distilled off, to complete transesterification.

The product so prepared was mixed with 20 g of phosphorous acid and 35 g of tetrakis[methylene-3-(3,5-di-tert.butyl-4-hydroxyphenyl)propionic acid]methane in an autoclave. The mixture was maintained at 245°C under a reduced pressure of 0.4 mmHg over a period of 3.5 hours to complete polycondensation. The polymer so prepared had a softening point of 229.4°C, a carboxyl end group content of 27.7 equivalents/$10^6$ g and an intrinsic viscosity of 0.997 dl/g and was colorless.

What we claim is:

1. A process of preparing a linear polyester predominantly comprised of the units derived from terephthalic acid and butanediol-1,4 characterized in that the esterification of terephthalic acid with butanediol-1,4 or the transesterification of a lower dialkyl ester of terephthalic acid with butanediol-1,4 is carried out in the presence of, as catalysts, 0.001 to 0.5 percent by weight of at least one organo-tin compound and 0.001 to 0.5 percent by weight of at least one organo-titanium compound, both based on the weight of the resulting polyester, said organo-titanium compound is selected from the group consisting of (1) a compound expressed by the formula.

(OR)$_4$              (1)

where R is selected from an alkyl group having 1 to 30 carbon atoms and an aryl group having 6 to 12 carbon atoms, and the same as or different from each other, (2) a product prepared by the hydrolysis of the compound (1), (3) a product prepared by the transesterification of the compound (1), and (4) a product prepared by the hydrolysis and transesterification of the compound (1), and said organo-tin compound is selected from the group consisting of compounds expressed by the formulae

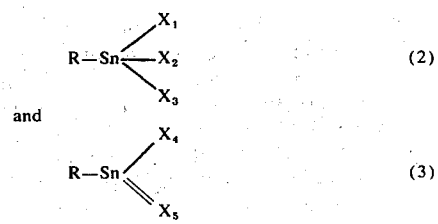

where R is selected from an alkyl group having 1 to 30 carbon atoms and an aryl group having 6 to 12 carbon atoms; $X_1$, $X_2$, $X_3$ and $X_4$ are selected from an alkyl group having 1 to 30 carbon atoms, an aryl group having 6 to 12 carbon atoms, an acyloxy group having 1 to 10 carbon atoms, cyclohexyl group, hydroxyl group, carboxylic acid residue and halogen, and each of $X_1$, $X_2$, and $X_3$ is the same as or different from the others; and $X_5$ is either sulfur or oxygen.

2. A process according to claim 1 wherein said organo-titanium compound is present in an amount of 0.01 to 0.1 percent by weight based on the weight of the resulting polyester.

3. A process according to claim 1 wherein said organo-tin compound is present in an amount of 0.01 to 0.1 percent by weight based on the weight of the resulting polyester.

4. A process according to claim 1 wherein the ratio of said organo-titanium compound to said organo-tin compound is within the range from 10:1 to 1:10 by weight.

5. A process according to claim 1 wherein the molar ratio of butanediol-1,4 to terephthalic acid or its lower dialkyl ester is within the range from 1.2 to 2.0.

6. A process according to claim 1 wherein the esterification of terephthalic acid with butanediol-1,4 is effected further in the presence of 1 to 15% by weight, based on the weight of butanediol-1,4, of water.

7. A process according to claim 6 wherein the water is present in an amount of 2 to 8 percent by weight based on the weight of butanediol-1,4.

8. A process according to claim 1 wherein said esterification or transesterification product is polycondensed in the presence of 0.001 to 0.5 percent by weight of at least one phosphorus compound and 0.001 to 0.5 percent by weight of at least one hindered phenol compound, both based on the weight of the resulting polyester, wherein said hindered phenol compound is selected from the compounds represented by the formulae.

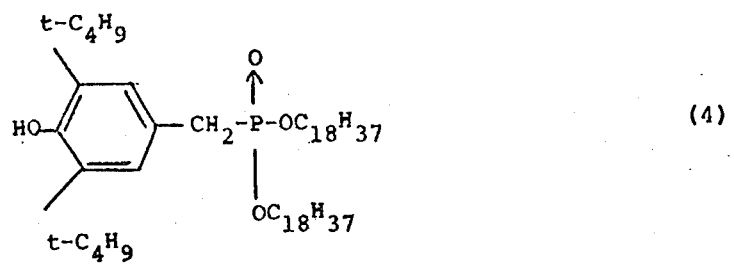

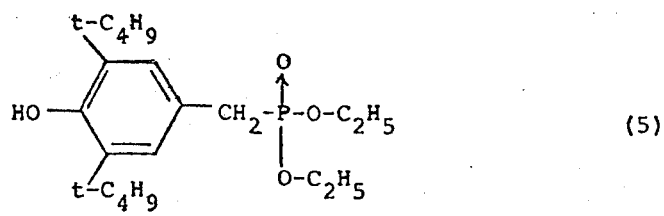

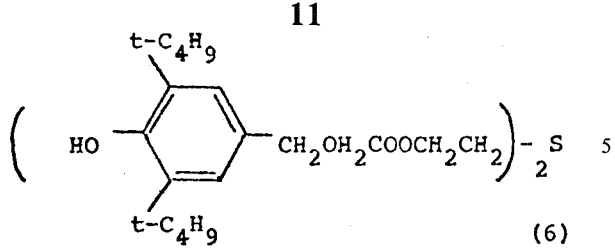

(6)

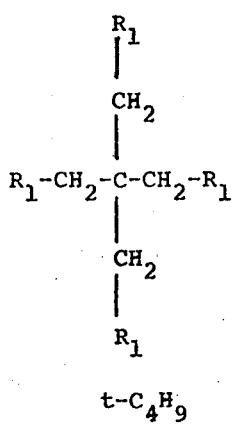

(7)

where $R_1$ is

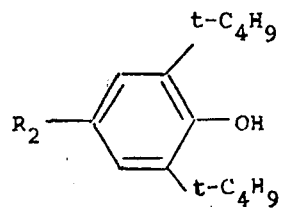

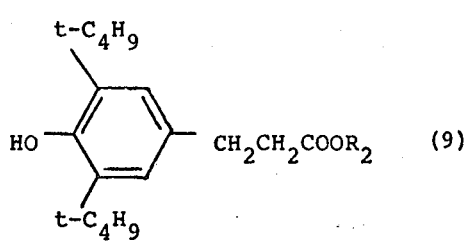

(8)

(9)

where $R_2$ is selected from octyl, lauryl and stearyl groups,

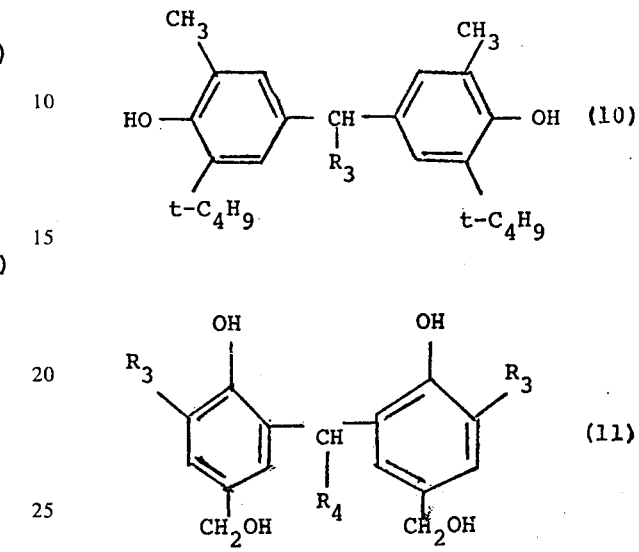

(10)

(11)

where $R_3$ and $R_4$ are selected from methyl, ethyl, n-propyl, isopropyl, n-butyl, isobutyl, t-butyl, amyl, octyl, nonyl and lauryl groups and said phosphorus compound is selected from the group consisting of phosphoric acid, phosphorous acid, hypophosphoric acid, phosphoric acid triamide, ammonium phosphate, momomethyl phosphate, dimethyl phosphate, monoethyl phosphate, diethyl phosphate, trimethyl phosphate, dimethyl phosphite, trimethyl phosphite, phenyl-phosphonic acid, dimethyl phenylphosphonate, dimethyl benzylphosphonate, dimethyl ethylphosphonate, diphenylphosphinic acid, tetrakis-hydroxymethyl-phosphonium chloride and triphenyl phosphine oxide.

* * * * *

UNITED STATES PATENT AND TRADEMARK OFFICE
CERTIFICATE OF CORRECTION

PATENT NO. : 3,936,421
DATED : February 3, 1976
INVENTOR(S) : HAYASHI ET AL

It is certified that error appears in the above-identified patent and that said Letters Patent are hereby corrected as shown below:

Column 2, line 11 and Column 9, line 26 (in Claim 1),

"$(OR)_4$" should be "$Ti(OR)_4$", respectively.

Signed and Sealed this

Tenth Day of August 1976

[SEAL]

Attest:

RUTH C. MASON
*Attesting Officer*

C. MARSHALL DANN
*Commissioner of Patents and Trademarks*